Nov. 7, 1967

I. DIETRICH ETAL 3,351,754

MAGNETIC LENS COMPRISING AN ANNULAR ELECTRIC COIL
AND SUPERCONDUCTING MATERIAL TO SHAPE
THE MAGNETIC FLUX

Filed Aug. 12, 1964

Nov. 7, 1967  I. DIETRICH ETAL  3,351,754
MAGNETIC LENS COMPRISING AN ANNULAR ELECTRIC COIL
AND SUPERCONDUCTING MATERIAL TO SHAPE
THE MAGNETIC FLUX
Filed Aug. 12, 1964  2 Sheets-Sheet 2

United States Patent Office 3,351,754
Patented Nov. 7, 1967

3,351,754
MAGNETIC LENS COMPRISING AN ANNULAR ELECTRIC COIL AND SUPERCONDUCTING MATERIAL TO SHAPE THE MAGNETIC FLUX
Isolde Dietrich, Erhard Berkl and Reinhard Weyl, Munich, and Karl-Heinz Herrmann, Berlin, Germany, assignors to Siemens & Halske Aktiengesellschaft, Berlin and Munich, Germany
Filed Aug. 12, 1964, Ser. No. 389,089
Claims priority, application Germany, Aug. 16, 1963, S 86,746
13 Claims. (Cl. 250—49.5)

Our invention relates to corpuscular-ray or particle beam magnetic lens devices and preferably, though not exclusively, to magnetic lenses for electron microscopes.

The resolving power of an electron microscope or other corpuscular-ray optical device depends upon the aperture-error of the lenses, predominantly upon the errors inherent in the objective lens. The aperture-error constant is determined by the magnetic field strength in the lens gap and by the axial length of the region in which the magnetic lens field acts upon the corpuscular ray. The higher the magnetic field strength and the smaller the axial length, the lower is the aperture-error constant and the better is the resolving power of the lens device.

Attempts toward improving these values in conventional devices have been limited by the magnetic behavior of the iron-containing materials employed. Due to saturation phenomena, the field strength cannot be increased at will and, for avoiding saturation, the magnetic-flux conducting structures must remain within given cross-sectional dimensions. In the conventional designs of such lens devices, therefore, the magnetic field strength cannot be increased and the axial length of the action region of the magnetic field cannot be reduced beyond the limits reached.

For further improvement despite such difficulties, it has become known to utilize in corpuscular-ray lens devices the properties of superconducting materials, i.e. materials which exhibit extreme high electric conductivities at extremely low temperatures in the vicinity of absolute zero.

Our inention more particularly relates to magnetic lens devices of the latter type for use in corpuscular-ray apparatus operating while being continuously evacuated by a pump, preferably to objective lens devices for electron microscopes. That is, the invention concerns magnetic lens devices which contain superconducting components in heat-conducting connection with cryogenic means and so arranged that these cooled components cause the magnetic flux produced by a suitable number of current-traversed windings to be concentrated to a reduced cross section in the region of the ray.

A known lens device thus equipped with super-conducting components preserves the conventional construction with two annular pole shoes of iron-containing material located axially opposite each other at a given gap distance, and comprises a superconducting shield which prevents the occurrence of stray flux from the pole shoes outside of the lens gap. Due to such suppression of stray flux in the vicinity of the pole shoes, this device affords some concentration of the magnetic flux in the region of the corpuscular ray, but the axial length of the region in which the magnetic flux acts upon the ray remains relatively long so that no decisive improvement in resolving power is attainable. Furthermore, there is no external shielding of the lens winding and their flux-carrying parts. Hence, the occurrence of stray flux which finds a closed flux path outside of the pole shoes is not reliably prevented.

In another known lens device attempting to utilize superconductance, the pole shoes, likewise consisting of iron-containing material, are located at the height of the upper or lower front face of the lens winding. A tube of superconducting material extends between the two pole shoes and surrounds the corpuscular ray for conducting the magnetic flux. In this device, a stray flux can be formed in the free space between the superconducting tube and the lens winding, and the axial length of the region in which the magnetic flux acts upon the ray is just as large as the height of the lens winding.

Further known is a device in which two lens windings are placed axially upon each other with several interposed discs of superconducting material whose central apertures are coaxial for the passage of an electron ray. Aside from the large length of the lens gap, this construction possesses two disadvantages. In the first place, there is the danger that detrimental stray flux will occur. Secondly, the apertured discs must be provided with slits for preventing circulating currents in the discs, and this results in asymmetry of the magnetic field which is apt to cause lens errors.

It is an object of our invention to provide a corpuscular-ray magnetic lens device with superconducting components, which avoids the disadvantages of the known lens devices and affords a substantially full utilization of the advantages afforded by the provision of the superconducting components, thus achieving various improvements that contribute to considerably increasing the resolving power.

According to the invention, the lens device is provided with an annular envelope of superconducting material which encloses the annular lens-coil means and forms a magnetic shield around all sides of the coil means. The envelope has an annular central opening around the coil axis identical with the optical axis of the corpuscular ray. The superconducting envelope is further connected or connectable with low temperature cooling means to be kept at cryogenic temperature during operation of the lens device in a vacuum maintained by continuous pumping. Furthermore, a disc of superconducting material extends in the annular opening of the envelope in a direction transverse to the lens axis so as to form a partition which, when the disc is cooled to superconductivity, is impermeable to the magnetic flux produced by the lens coil means. The partitioning disc has a central aperture outside of the magnetic shield formed by the superconducting envelope, this aperture constituting a passage for the ray as well as for the magnetic flux which issues through the annular opening.

Preferably employed are high-field superconducting materials, i.e. materials that retain or exhibit increased electric conductance when subjected to a magnetic field of high intensity. The lens coil means may consist of one or more windings or individual coils, preferably also of superconducting material.

In a lense device according to the invention, the superconducting components force the magnetic flux to issue in high concentration through the two small ring-shaped openings in the annular magnetic shield, in order to pass through the narrow central aperture of the transverse disc, thus being caused to act upon the ray within a greatly constricted space, namely within the aperture of the disc; and this effect is not eliminated in the event of saturation phenomena. This affords the assurance that the magnetic field possesses the highest field strength at the required spot and that the axial length of the region in which the magnetic flux acts upon the ray is a minimum. This axial length can be adapted to any particular requirements by correspondingly selecting the thickness of the apertured disc.

A device according to the invention, in which the magnetic flux is conducted by means of the above-mentioned superconducting components, also affords the advantageous possibility of keeping the magnetic flux path entirely free of iron or other ferromagnetic material.

Since a magnetic flux in a superconducting annulus or in an apertured disc, once established, remains constant independently of external events, suitable expedients must be observed with respect to starting the flow of current through the coil and thereby producing the magnetic flux, and with respect to initiating the cooling of the apertured plate. It should also be noted that the annular magnetic shield which encloses the lens coil exhibits the same behavior. According to the invention, therefore, it is preferable to provide for a heat-conducting connection between the cryogenic means and the annular shielding envelope prior to the moment when the current for the lens coil is switched on, but to close the heat-conducting connection between the low-temperature cooling means and the apertured disc only after the magnetic flux has become effective. This makes certain that the full magnetic flux can pass out of the ring-shaped opening in the annular magnetic shielding envelope and thus can pass through the aperture in the disc. If the apertured disc were made superconducting before initiating the magnetic flux, the disc would subsequently no longer permit the passage of appreciable flux.

It is particularly advantageous to have the low-temperature cooling means, operating for example with with liquid helium, heat-conductively connected with the apertured disc at localities near the outer periphery of the disc so that, when the heat-conducting connection is completed, the disc starts at the periphery to become superconducting. This is preferable because the onset of superconductance, rendering the disc material impermeable to the magnetic field, advances from the periphery inwardly and thus progressively constricts the entire magnetic flux produced by the lens coil, and thereby concentrates the entire flux in the region of the corpuscular ray. The same effect can be obtained by providing a heating winding on the central area of the apertured disc. This affords a temperature control in the sense required to have the state of superconductivity and magnetic impermeability advance from the periphery inwardly toward the central aperture.

The fact that during operation the lens components close to the corpuscular ray are maintained at extremely low temperatures involves the danger that any residual gases or vapors still contained in the vacuum, may precipitate at these localities. If gases or vapors are thus frozen to solid state on the surfaces facing the ray, they may become electrically charged by stray corpuscles of the ray and thereby deflect the ray in an uncontrolled manner. This would impair the resolving power of the lens device and hence may affect or defeat the purposes of the invention. However, the expedients mentioned in the following are available to prevent such trouble.

For the purpose just mentioned, and according to another feature of the invention, the lens device is equipped with a cryopump whose components are at a lower temperature than the superconducting components of the lens proper. A cryopump is a pump device acting as a cooling trap in which gases or vapors are frozen out so that their partial pressures are reduced. Although in a lens device combined with a cryopump, the otherwise attainable maximum improvement in resolving power is not fully achieved since the superconducting components of the lens are not brought to the lowest feasible temperature, this is negligible in comparison with the advantage of preventing gases or vapors from freezing out upon lens surfaces and then causing a much larger reduction in resolving power. The provision of the lens with a cryopump is not predicated upon using any particular construction of the lens proper.

The temperature gradient between the superconducting components of the lens proper on the one hand, and the components of the cryopump on the other hand, can be established by having the pump components and the lens components in heat-conducting connection with one and the same cryogenic medium but giving the respective connections different heat-conducting qualities and/or holding the superconducting lens components at a higher temperature with the aid of heat-supplying means. Thus, the components of the cryopump may be connected directly with the cryogenic medium, and the superconducting components of the lens proper may be connected thereto indirectly through the components of the cryopump. Such an indirect connection may also be provided within the lens proper by having the apertured disc in heat-conducting connection with the annular shielding envelope, and the latter in heat-conducting connection with the cryopump components which, in turn, are heat-conductingly connected with the cryogenic means.

According to another feature of the invention, the corpuscular ray passes through tubular pieces of magnetically ineffective and heat-insulating material along regions close to the components of the cryopump. Such tube pieces are preferably provided with apertured diaphragms for the passage of the ray. In the latter case, the walls of the tube pieces are provided with openings, preferably slots whose total cross section is larger than the total cross-sectional area of the diaphragm apertures, so that the high vacuum of the cryopump will also obtain in the interior of the tubular pieces.

The above-mentioned and further objects, advantages and features of our invention, said features being set forth with particularity in the claims annexed hereto, will be apparent from, and will be mentioned in, the following in conjunction with embodiments of lens devices according to the invention illustrated by way of example in the accompanying drawings, in which:

The same reference characters are applied in all illustrations for corresponding components respectively.

Figure 1:
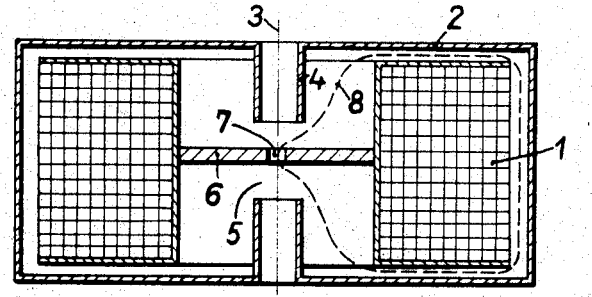
FIG. 1 is a schematic view, in section, of an embodiment of the magnetic lens device of relatively simple construction of the present invention.

The lens device according to FIG. 1 is provided with a single electric field coil 1 which is enclosed on all sides by an envelope 2 of superconducting material. The envelope forms a magnetic shield and has the shape of an annular body. The inner surface 4 of the shielding envelope 2, facing the axis of the corpuscular ray 3, forms a ring-shaped gap opening 5 across which a superconducting disc 6 with a central aperture 7 is mounted. Between the apertured disc 6 on the one hand and the edges of the ring-shaped opening 5 there remains a sufficient interspace to permit the passage of the magnetic flux, represented in FIG. 1 by a field line 8.

When the lens device is in operation, the superconducting disc 6 within the annular shielding envelope 2 constitutes a partition impermeable to the magnetic flux. This forces the magnetic flux to issue from the ring-shaped opening 5 through the aperture 7 which surrounds the axis of the ray 3 with smallest possible clearance. Consequently the magnetic field strength in the region of the ray is extremely high, and the axial length of the region in which the ray is acted upon the flux is very small. The field gradient, therefore, is extremely large.

The superconducting components herein mentioned may consist of vanadium, tantalum, niobium or preferably their alloys such as $Nb_3Sn$ or nickel-niobium alloy.

Ferromagnetic elements are not superconducting, although they may be contained in some superconducting alloys. The illustrated lens device is free of iron and does not contain any other ferromagnetic materials in or near the magnetic flux path.

It will be understood that the superconducting components 2 and 6 in a lens device according to FIG. 1 are heat-conductively connected with a low-temperature cooling means when in operation. This is schematically indicated in FIG. 2 showing an embodiment of which a device similar to that of FIG. 1 constitutes a component part.

Figure 2:
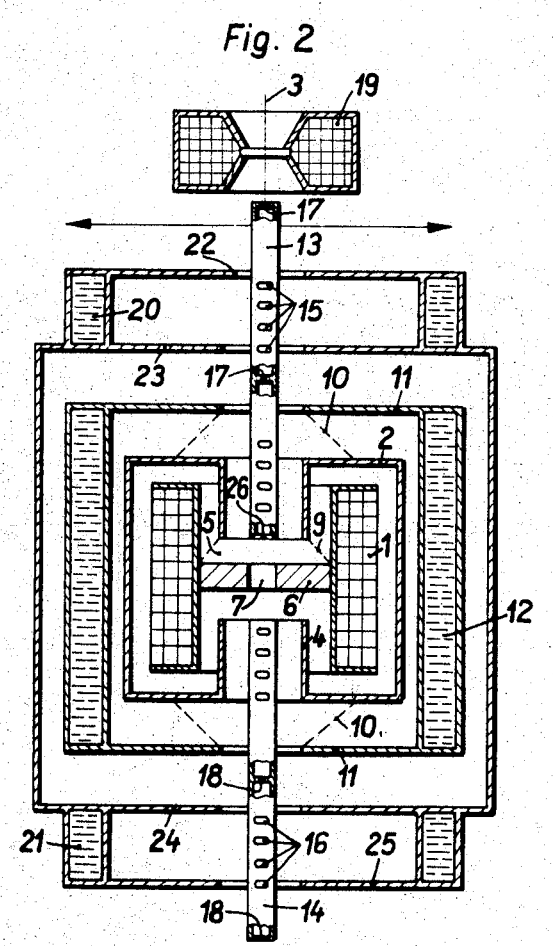
FIG. 2 is a schematic view, in axial section, of another embodiment of the magnetic lens device of the present invention, which is more elaborate, indicating several heat-conducting connections diagrammatically by broken lines.

According to FIG. 2, the apertured disc 6 which extends across the annular gap of the shielding envelope 2 has the region of its outer periphery joined by a heat-conducting connection 9 with the annular envelope 2; and the envelope 2 is connected by a heat-conducting connection 10 with a diaphragm member 11 of a cryopump which in this embodiment is combined with the lens device proper. The diaphragm 11 of the cryopump is in direct heat-conducting connection with the cooling medium 12 which serves for actuating the cryopump as well as for producing the superconducting condition of components 6 and 2. The medium 12 is constituted, for example, by a vessel filled with liquid helium. Mutually corresponding heat-conducting connections in the upper and lower portions respectively of FIG. 2 are identified by the same reference characters.

It will be understood that the entire device is mounted in a vacuum vessel which is connected with a vacuum pump operating continuously to maintain the required vacuum during operation of the lens device.

Figure 3:
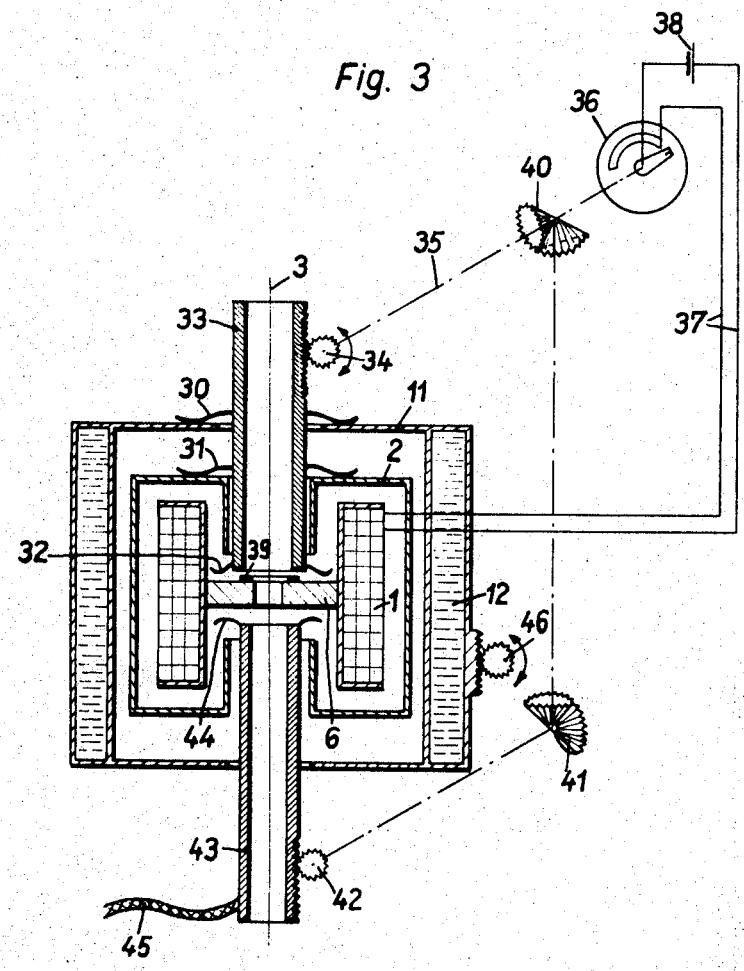
FIG. 3 is a detailed sectional view of a device for establishing and controlling the heat-conducting connection in a magnetic lens device of the type of FIG. 2.
Figure 4:
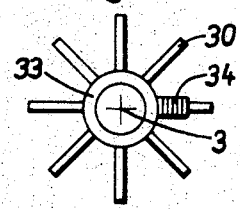
FIG. 4 is a plan view of components shown in FIG. 3.

As mentioned above, at the moment when the lens-coil current is switched on and the production of the magnetic flux by the coil commences, only the annular shielding envelope 2 should be in the superconducting state, but not the apertured disc 6 because otherwise the magnetic flux could not pass through the disc. For this reason, the device according to FIG. 2 is provided with means that permit temporarily eliminating or reducing the heat-conducting connections 9. In principle, this can be done without change or movement of structure simply by initially heating the disc 6 or its central portion with the aid of an electric heater winding. However, a different device for performing the desired sequential operation is shown in FIGS. 3 and 4 and will be hereinafter described.

Since the heat-conducting connection 9, according to FIG. 2, is located near the outer periphery of the apertured disc, the progressive cooling of the disc to below the critical temperature at which superconductivity occurs, progresses inwardly from the outer periphery. This imparts to the disc the function of a collector for the magnetic flux produced by the lens coil 1. That is, when the flux first becomes effective, it can pass through the entire diamagnetic disc 6, and while the disc, commencing from its outer periphery, reaches superconducting state at which it becomes impermeable to the magnetic flux lines, these flux lines are more and more displaced toward the middle and toward the aperture 7 traversed by the corpuscular ray. The result is an extremely high magnetic field strength at the location where it is exclusively needed, namely in the immediate range of the ray along the axis of the aperture 7.

In the regions of the device that are close to the components of the cryopump, the lens axis and consequently the ray passing through the lens device, is shielded from the cryopump components by tubular pieces 13 and 14 consisting of magnetically inactive material such as German silver or, preferably, thermally insulating material. The wall or surface of the tubes 13 and 14 is provided with openings in the shape of slots 15 and 16 whose area, in totality, is larger than the total area of the apertures provided in diaphragms 17 and 18 which extend across the tubes 13 and 14. Mounted at the lower end of the upper tube 13 is the specimen carrier 26. The tubes 13 and 14 may also be made of metal mesh, in which case no slots need by provided to permit the vacuum of the microscope or other corpuscular-ray apparatus to be effective inside the tubes.

The lens device according to FIG. 2, as described above, constitutes the objective lens of an electron microscope and is shown located in the electron-ray path behind a condenser lens 19. Located between the condenser 19 and the components 11 and 12 of the cryopump that surround the objective lens proper, as well as at the opposite, lower side of the objective lens, there are mounted a number of cryogenic components formed by coolant containers 20 and 21 in conjunction with pairs of centrally apertured diaphragms 22, 23 and 24, 25 which are heat-conductively joined with the coolant vessels 20 and 21, respectively. The coolant devices 20 and 21 are maintained at a temperature higher than that of the coolant in vessel 12. If the coolant in vessel 12 is liquid helium, as mentioned above, then the devices 20 and 21 are cooled by liquid nitrogen, for example. These additional cryogenic means perform two functions. In the first place they prevent the coolant 12 from being heated by heat radiation. Furthermore, they reduce the danger that gases and vapors may freeze out on the active surface of the lens proper, namely in the aperture 7 of the disc 6 or in close proximately to that aperture. The latter effect is due to the fact that the cooling devices 20 and 21 operate essentially as cooling traps which catch any gas or vapor residues as might otherwise reach the lens aperture when passing through the diaphragm openings.

FIGS. 3 and 4 illustrate by way of example an embodiment of means for establishing the heat-conducting connections with the cryogenic means in the above-described sequence relative to the switching of the lens current. The heat-conducting connections are formed by springs 30, 31 and 32, each forming part of a spider. The spring spiders are axially spaced from each other and mounted coaxially on a tube 33 of heat-conducting material, such as copper, which surrounds the lens axis and hence the corpuscular ray 3. The springs 30 are engageable with the cryopump component 11 connected with the cryogenic medium 12. The springs 31 are engageable with the shielding envelope 2 and the springs 32 with a marginal area of the apertured disc 6. The springs 30, 31, 32 may consist of copper or a copper alloy.

The tube 33 has a threaded portion meshing with a pinion 34. The axial spacing between the spring spiders is such that in a first position of the driving pinion 34 and of the tube 33, a heat-conducting connection is completed from the cryogenic means 12 through spring spiders 30 and 31 with the cryopump component 11 on the one hand and through springs 30, tube 33 and springs 31 with the shielding envelope 2 on the other hand. This position is shown in FIG. 3. After the envelope 2 is cooled below its critical temperature and has become superconducting, the electric current for energizing the lens coil 1 is switched on.

Thereafter the apertured disc 6 is to be cooled below its critical temperature. For this purpose the driving pinion 34 is rotated a further extent and moves the tube 33 downward until the spring spider 32 form a heat-conducting contact with the disc 6. In this condition the disc 6 also assumes the superconducting state, as described in the foregoing.

It is particularly favorable to couple the control switch for the lens current with the drive for the tube 33 so that the lens current is switched on by operation of the drive when the tube 33 is intermediate the two above-described positions. Thus, as schematically shown in FIG. 3, the drive shaft 35 for pinion 34 is connected with the movable member of a control switch 36. As the shaft 35 slowly rotates, the switch 36 closes the energizing circuit 37 of the lens coil 1 after the springs 30 and 31 have reached the engaging position shown in FIG. 3, but before the springs 32 are in contact engagement with the disc 6. The circuit 37, energized from a suitable current source 38 of constant voltage, remains thereafter closed when the springs 32 are in engagement wth the disc 6.

By raising the tube 33 with the springs, the heat-conducting connection with the apertured disc 6 is first eliminated so that the disc can be heated for eliminating soiling or other purposes. During the further upward travel of the tube 33, the switch 36 is opened. Then in a third position of tube 33, the springs 30 and 31 are lifted and eliminate the heat-conducting connection to component 2 and, if desired, also to component 11.

In the embodiment shown in FIG. 3, the just-mentioned heating is effected by a heater winding 39 whose leads (not shown) can be switched into connection with a current source.

The drive 34, 35 may be coupled with further heat-conducting means which, after eliminating the above-described heat-conducting connections, are placed in contact with disc 6 and, if desired, also in contact with the shielding envelope 2 in order to form heat-conducting connections for heating these components. Such a heating device is also provided in the embodiment of FIG. 3. The drive shaft 35 is coupled by spur or friction gears 40, 41 with a pinion 42 meshing with rack teeth on a tube 43 of copper or other good heat conducting material which carries a spider of springs 44. The tube 43 is lifted by pinion 42 so as to place the springs 44 into good thermal contact with the disc 6 when the springs are lifted. The tube 43 is connected, for example by a flexible copper cable 45, with apparatus parts which are at normal room temperature or elevated temperature to effect the desired heating of disc 6.

In some cases, the apertured disc 6 is sufficiently subjected to heating by the electron ray. In such cases, the springs 31 and 32 with the intermediate portion of the tube 33 may also serve to heat the annular shielding envelope 2. For this purpose the device according to FIG. 3 permits disconnecting the tube 33 from the coolant vessel 12. The vessel 12 carries rack teeth engaged by a pinion 46. When the pinion is turned to move the vessel 12 downwardly, the springs 30 are separated from the cryogenic diaphragm 11, whereas the springs 31 and 32 remain in contact with the envelope 2 and the disc 6 respectively. As a result, the disc, now heated by the electron ray, is heat-conductively connected with the shielding envelope 2 through springs 32, tube 33 and springs 31 while being separated from the cryogenic medium, so that the envelope 2 is also heated.

In lens devices as illustrated and described, the coil structure 1 with the apertured disc 6 is fixed in position relative to the shielding envelope 2, and the latter is held in fixed position relative to the surrounding vessel structure 12 by conventional spacers (not illustrated) of heat-insulating and non-magnetic material. In a device according to FIG. 2, the member 14 and the condenser lens 19 are likewise mounted in a fixed position. However, the tubular member 13 may be secured to a supporting structure, such as a table, which permits shifting the tubular member 13 horizontally, this being indicated by horizontal arrows, for the purpose of correspondingly displacing the holder 26 and hence the specimen transverse to the ray axis 3 in the conventional manner.

It should be understood that the invention is not limited to the embodiments illustrated on the drawing. For example, a reliable adjustment of the temperature gradient between the superconducting components of the lens proper on the one hand, and the cryopump components on the other hand, may be provided with the aid of heat-conducting connections which lead to other parts of the corpuscular-ray apparatus and which possess a sufficient heat capacity, or form a connection with the ambient space. This affords the possibility of heating these components after opening the heat-conducting connections of the superconducting components with the cryogenic medium, if despite the provision of the cryopump any soiling of surfaces in the lens proper has occurred. This also permits rapidly adjusting the normal conductivity state of the superconducting components. In all such cases, the invention affords a high concentration of the magnetic flux in the region of the corpuscular ray and a resulting increase in resolving power, and it also permits giving the lens proper an iron-free construction.

To those skilled in the art, it will be obvious from a study of this disclosure that such and other modifications are readily applicable and hence that the invention can be given embodiments other than particularly illustrated and described herein, without departing from the essential features of our invention and within the scope of the claims annexed hereto.

We claim:

1. A particle beam magnetic lens device, comprising a lens structure defining a lens axis and having annular electric coil means coaxially around said axis for producing a lens magnetic field and an annular envelope of superconducting material enclosing said coil means, said envelope having an inner surface around the axis of said coil means, said envelope forming a magnetic shield around all sides of said coil means and having an annular opening formed by its inner surface around the coil axis, said envelope being completely closed with the exception of the annular opening thereof, a centrally apertured disc of superconducting material extending in said annular opening transverse to said axis, said disc being sufficiently spaced from the annular opening of said annular envelope to permit the passage of the magnetic flux produced by said coil, cryogenic means, heat-conducting means for connecting said cryogenic means with said envelope and said disc, said disc forming, when superconducting, a partition within said annular envelope which is impermeable to the magnetic flux produced by said coil, the central aperture of said disc being outside of said magnetic shield and constituting a passage for the beam as well as for the magnetic flux issuing through said annular opening.

2. A particle beam magnetic lens device for use as objective lens in an electron microscope, comprising a lens structure defining a lens axis and having annular electric coil means coaxially around said axis for producing a lens magnetic field and an annular envelope of superconducting material enclosing said coil means, said envelope having an inner surface around the axis of said coil means, said envelope forming a magnetic shield around all sides of said coil means and having an annular opening formed by its inner surface around the coil axis, said envelope being completely closed with the exception of the annular opening thereof, a centrally apertured disc of superconducting material extending in said annular opening transverse to said axis, said disc being sufficiently spaced from the annular opening of said annular envelope to permit the passage of the magnetic flux produced by said coil, cryogenic means, heat-conducting means for connecting said cryogenic means with said envelope and said disc, said disc forming, when superconducting, a partition within said annular envelope which is impermeable to the magnetic flux produced by said coil, the central aperture of said disc being outside of said magnetic shield and constituting a passage for the beam as well as for the magnetic flux issuing through said annular opening, a tubular structure of non-magnetizable material coaxially mounted in said annular opening and having an end axially spaced from said disc, and a specimen holder mounted on said end of said tubular structure.

3. A particle beam magnetic lens device, comprising a lens structure defining a lens axis and having annular electric coil means coaxially around said axis for producing a lens magnetic field, said coil means having a magnetic flux path free of iron, and an annular envelope of superconducting material enclosing said coil means, said envelope having an inner surface around the axis of said coil means, said envelope forming a magnetic shield around all sides of said coil means and having an annular opening formed by its inner surface around the coil axis, said envelope being completely closed with the exception of the annular opening thereof, a centrally apertured disc of superconducting material extending in said annular opening transverse to said axis, said disc being sufficiently spaced from the annular opening of said annular envelope to permit the passage of the magnetic flux produced by said coil, cryogenic means, heat-conducting means for connecting said cryogenic means with said envelope and said disc, said disc forming, when superconducting, a partition within said annular envelope which is impermeable to the magnetic flux produced by said coil, the central aperture of said disc being outside of said magnetic shield and constituting a passage for the beam as well as for the magnetic flux issuing through said annular opening.

4. A particle beam magnetic lens device, comprising a lens structure defining a lens axis and having annular electric coil means coaxially around said axis for producing a lens magnetic field and an annular envelope of superconducting material enclosing said coil means, said envelope having an inner surface around the axis of said coil means, said envelope forming a magnetic shield around all sides of said coil means and having an annular opening formed by its inner surface around the coil axis, said envelope being completely closed with the exception of the annular opening thereof, said envelope being axially and radially spaced from said coil means to form an interspace surrounding said coil means in all diametrical planes so as to provide in said envelope a closed flux path which extends outside said magnetic shield only where the flux passes through said opening and said aperture, said flux being free of ferromagnetic material, a centrally apertured disc of superconducting material extending in said annular opening transverse to said axis, said disc being sufficiently spaced from the annular opening of said annular envelope to permit the passage of the magnetic flux produced by said coil, cryogenic means, heat-conducting means for connecting said cryogenic means with said envelope and said disc, said disc forming, when superconducting, a partition within said annular envelope which is impermeable to the magnetic flux produced by said coil, the central aperture of said disc being outside of said magnetic shield and constituting a passage for the beam as well as for the magnetic flux issuing through said annular opening.

5. A particle beam magnetic lens device, comprising a lens structure defining a lens axis and having annular electric coil means coaxially around said axis for producing a lens magnetic field and an annular envelope of superconducting material enclosing said coil means and forming a magnetic shield around all sides of said coil means, said envelope having an innersurface around the axis of said coil means, said envelope having an annular opening formed by its inner surface around the coil axis, a centrally apertured disc of superconducting material extending in said annular opening transverse to said axis, cryogenic means, heat-conducting connectors for connecting said cryogenic means with said envelope and with said disc, an electric switch for controlling the current supply to said coil means, and sequence control means for heat-conductively connecting one of said connectors with said envelope before causing said switch to supply coil current and then connecting the other connector with said disc after magnetic flux produced by said coil means has commenced passing through said opening.

6. In a magnetic lens device according to claim 5, said other heat-conducting connector being engageable with said disc near the periphery of the latter so that said disc converts to superconductance progressively from its periphery toward its aperture.

7. A particle beam magnetic lens device, comprising a lens structure defining a lens axis and having annular electric coil means coaxially around said axis for producing a lens magnetic field and an annular envelope of superconducting material enclosing said coil means, said envelope having an inner surface around the axis of said coil means, said envelope forming a magnetic shield around all sides of said coil means and having an annular opening formed by its inner surface around the coil axis, said envelope being completely closed with the exception of the annular opening thereof, a centrally apertured disc of superconducting material extending in said annular opening transverse to said axis, said disc being sufficiently spaced from the annular opening of said annular envelope to permit the passage of the magnetic flux produced by said coil, cryogenic means, heat-conducting means for connecting said cryogenic means with said envelope and said disc, said disc forming, when superconducting, a partition within said annular envelope which is impermeable to the magnetic flux produced by said coil, the central aperture of said disc being outside of said magnetic shield and constituting a passage for the beam as well as for the magnetic flux issuing through said annular opening, and a cryopump having components located close to the outer side of said envelope near said axis, the components of said pump having a lower temperature than said envelope and disc when the latter are in the superconducting state.

8. A magnetic lens device according to claim 7, comprising heat-conducting connecting means which connect said cryopump with said cryogenic means to which said envelope and said disc are connected.

9. A particle beam magnetic lens device, comprising a lens structure defining a lens axis and having annular electric coil means coaxially around said axis for producing a lens magnetic field and an annular envelope of superconducting material enclosing said coil means and forming a magnetic shield around all sides of said coil means, said envelope having an inner surface around the axis of said coil means, said envelope having an annular opening formed by its inner surface around the coil axis, said envelope being completely closed with the exception of the annular opening thereof, a centrally apertured disc of superconducting material extending in said annular opening transverse to said axis, the aperture of said disc being outside of said magnetic shield and constituting a passage for the beam as well as for the magnetic flux issuing through said annular opening, said disc being sufficiently spaced from the annular opening of said annular envelope to permit the passage of the magnetic flux produced by said coil, cryogenic means, a cryopump having centrally apertured diaphragm components located close to the outer side of said envelope near said axis and at a lower temperature than said envelope and disc when the latter are in superconducting condition, said cryopump being in direct heat-conductive connection with said cryogenic means, and said envelope and disc being in indirect heat-conductive connection with said cryogenic means through said cryopump.

10. In a magnetic lens device according to claim 9, said disc being heat-conductively connected with said envelope, and said envelope being heat-conductively connected with said cryopump components.

11. A particle beam magnetic lens device, comprising a lens structure defining a lens axis and having annular electric coil means coaxially around said axis for producing a lens magnetic field and an annular envelope of superconducting material enclosing said coil means, said envelope having an inner surface around the axis of said coil means, said envelope forming a magnetic shield around all sides of said coil means and having an annular opening formed by its inner surface around the coil axis, said envelope being completely closed with the exception of the annular opening thereof, a centrally apertured disc of superconducting material extending in said annular opening transverse to said axis, said disc being sufficiently spaced from the annular opening of said annular envelope to permit the passage of the magnetic flux produced by said coil, cryogenic means, heat-conducting means for connecting said cryogenic means with said envelope and said disc, said disc forming, when superconducting, a partition within said annular envelope which is impermeable to the magnetic flux produced by said coil, the central aperture of said disc being outside of said magnetic shield and constituting a passage for the beam as well as for the magnetic flux issuing through said annular opening, a cryopump having components located close to the outer side of said envelope near said axis, the components of said pump having a lower temperature than said envelope and disc when the latter are in the superconducting state, and two tubular structures of magnetically inactive heat-insulating material coaxially disposed on opposite sides of said disc in axially spaced relation thereto, the lens axis extending through said two tubular structures, said tubular structures having transverse diaphragms with central apertures for the passage of the beam, and having lateral slots whose total cross-sectional area is larger than that of the diaphragm apertures.

12. A particle beam magnetic lens device, comprising a lens structure defining a lens axis and having annular electric coil means coaxially around said axis for producing a lens magnetic field and an annular envelope of superconducting material enclosing said coil means and forming a magnetic shield around all sides of said coil means, said envelope having an inner surface around the axis of said coil means, said envelope having an annular opening formed by its inner surface around the coil axis, a centrally apertured disc of superconducting material extending in said annular opening transverse to said axis, cryogenic means coaxially surrounding said axis in spaced relation to said envelope and disc, a coaxial tubular member of heat-conducting material displaceable along said axis, displacing means for axially displacing said tubular member, respective heat-conducting spring means mounted on said member and engageable with said cryogenic means and said envelope and said disc, said tubular member having a position at which said spring means form a heat-conducting connection of said cryogenic means with only said envelope and being displaceable to another position at which said spring means also form a heat-conductive connection of said cryogenic means with said disc.

13. A magnetic lens device according to claim 12, wherein said displacing means comprises driving means in engagement with said tubular member for imparting axial displacement to said tubular member.

References Cited

UNITED STATES PATENTS 3,008,044   11/1961   Buchhold _____ 250—49.5

WILLIAM F. LINDQUIST, *Primary Examiner.*

R. G. NILSON, *Examiner.*